Patented Aug. 15, 1950

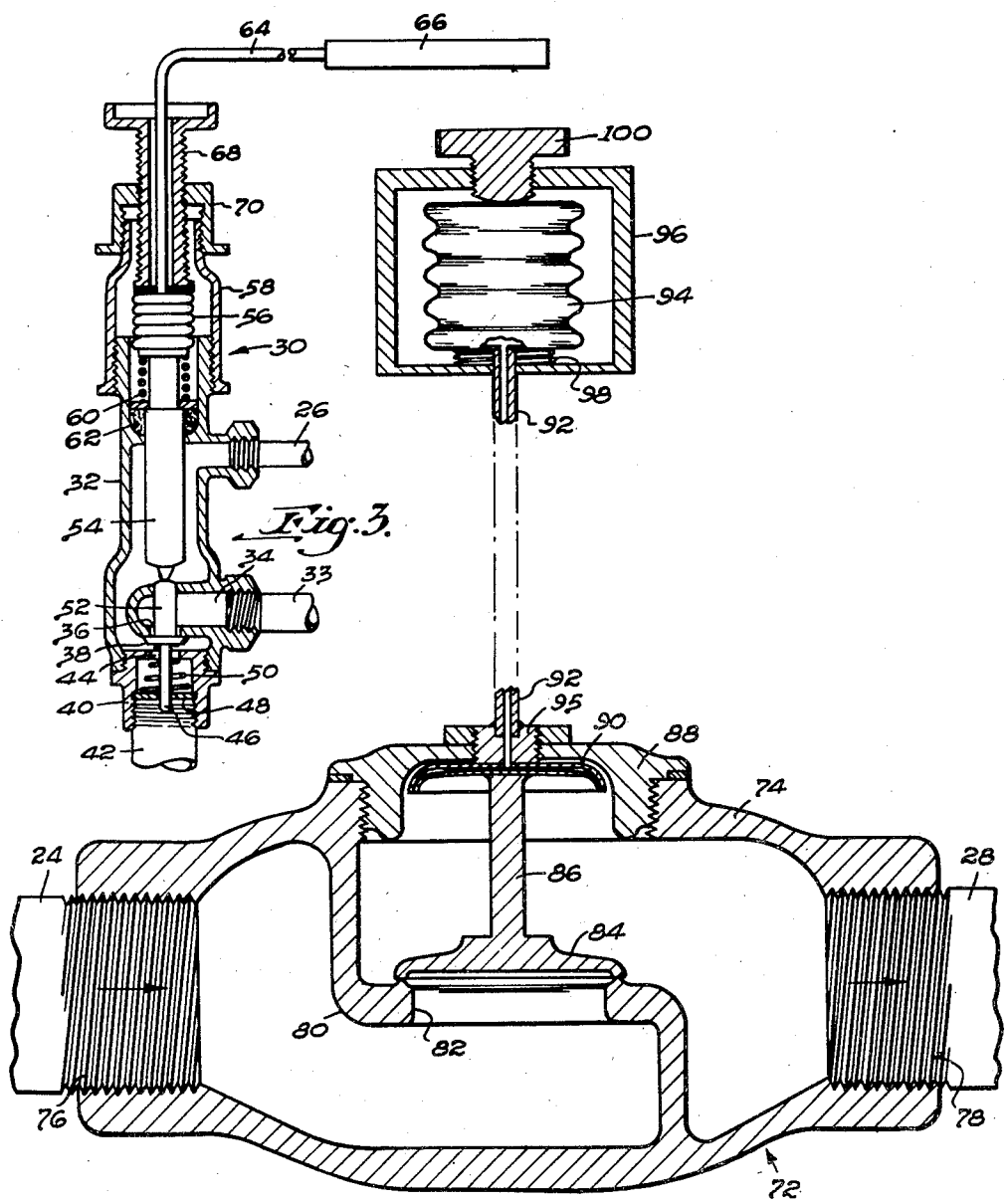

2,519,266

UNITED STATES PATENT OFFICE 2,519,266

TEMPERATURE CONTROL APPARATUS

Robert C. Main, Los Angeles, Calif., assignor to Robertshaw-Fulton Controls Company, a corporation of Delaware Application May 20, 1947, Serial No. 749,258

9 Claims. (Cl. 237—8)

This invention relates to control apparatus for air conditioning systems and, more particularly, to apparatus for controlling hot and cold water panel heating and cooling systems.

Space heating panels require a relatively large area from which the heat is radiated compared with the usual hot water or steam radiator. While the surface temperature of such panels is comparatively low, the presence of large masses of enclosing material for the pipe coils introduces additional heat storing capacity into the system. Consequently, a prolonged time-lag is inevitable before a marked adjustment of the heat output can be effected when the control devices no longer call for heat.

In the event of a rapid rise in outdoor temperature the time-lag referred to may prove objectionable. The combination of stored heat in the panel and outside temperature increase results in overheating of the space and discomfort to the occupants. Hence, an object of this invention is to control a panel heating system in such manner as to prevent excessive indoor temperatures due to rapid rise in outdoor temperatures.

Another object of the invention is to control the temperature of the circulating water in accordance with changes in outdoor temperatures.

Another object of the invention is to vary the temperature modulation of the heating water continuously in proportion to variation in the indoor temperature.

Another object of the invention is to render the system easily adaptable to installations of varying requirements for different indoor environments.

Another object of the invention is to utilize simple and economical means for accomplishing the elimination of the described undesirable features of panel heating and cooling systems.

Other objects and advantages will become apparent from the following description taken in connection with the accompanying drawings, wherein:

Fig. 2 is a cross section of one of the control valves shown schematically in Fig. 1;

Fig. 3 is a cross section of the water-mixing device shown schematically in Fig. 1.

Figure 1:
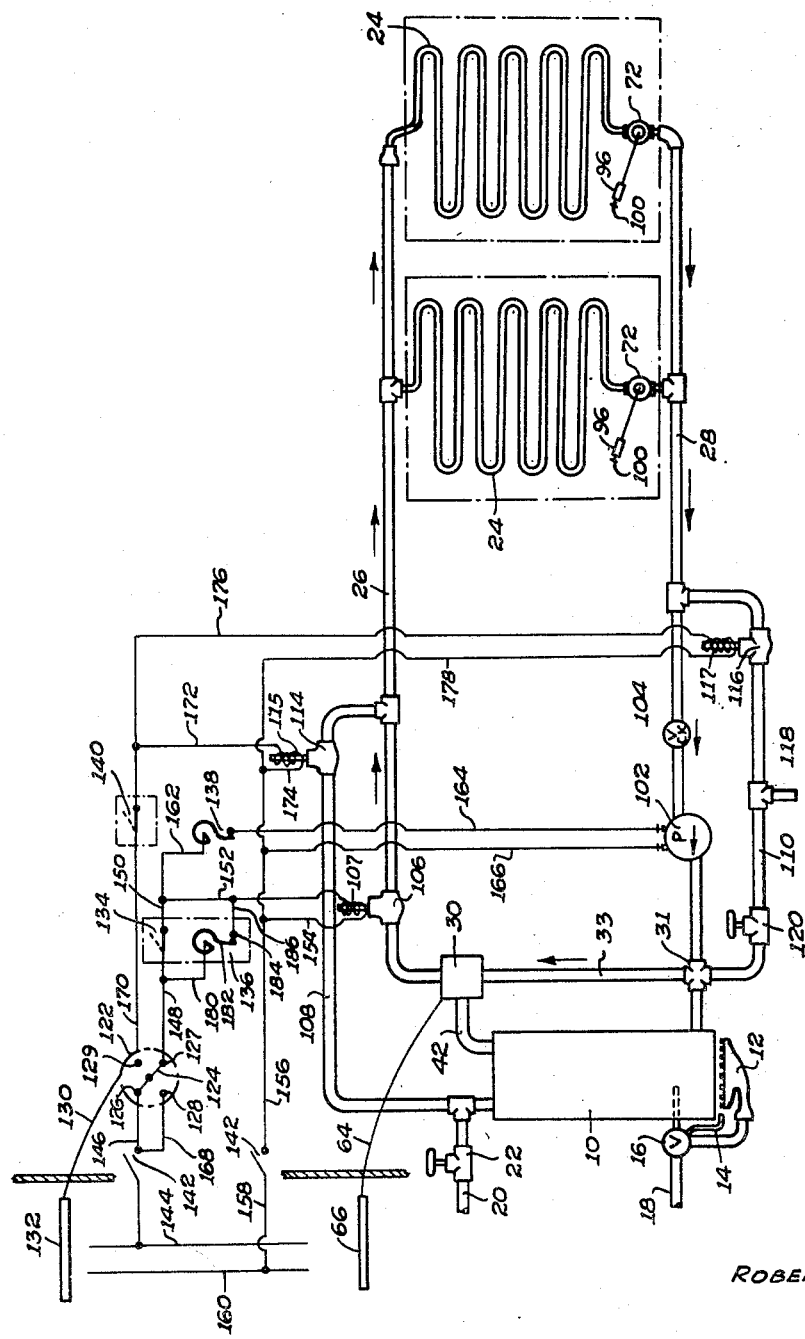
Fig. 1 is a schematic view of a panel heating system having a wiring diagram incorporated therewith.

Referring more particularly to the drawings, Fig. 1 thereof depicts a heating means for a fluid comprising a water heater 10 and main and pilot gaseous fuel burners 12 and 14 respectively. The flow of fuel to the main burner 12 and to the pilot burner 14 also, if desired, is controlled by a thermostatic valve device 16 of any known type interposed in the main fuel pipe 18. The water heater 10 is supplied with cold water under pressure from a main supply pipe 20 which is connected to a suitable source of supply such as a well, cooler or municipal water supply system. A manually operated shut-off valve 22 controls the flow of water in the main pipe 20.

Heat transfer means for circulating fluid in heat exchange relation with the heating means and delivering said fluid to a space is provided. This heat transfer means includes a plurality, in this instance two, of panel heating coils 24 located in different spaces to be heated and which coils are customarily embedded in the ceilings, walls or floors of different rooms. A supply pipe 26 and return pipe 28 are each connected at one end thereof to opposite ends of the coils 24. The supply pipe 26 is connected at the other end thereof to a mixing valve 30 which is shown in detail in Fig. 3. The other end of the return pipe 28 is connected to the water heater 10.

The mixing valve 30 comprises a main casing 32 having an outlet opening therein to which the pipe 26 is connected. A cross fitting 31 is connected to the return pipe 28 and carries a pipe 33 connected to an inlet opening in the main casing 32 of the mixing valve 30 and disposed in spaced relation to the outlet opening for the supply pipe 26. A valve chamber 34 communicates with the inlet opening for the pipe 33 and has a lower wall provided with a passage 36 for fluid and controlled by a reciprocable valve member 38 in its upseated position. An end casing 40 is secured to the main casing 32 and is provided with an opening for the reception of one end of a pipe 42 having its other end connected to the water heater 10 to convey heated fluid therefrom.

The flow of heated fluid from the pipe 42 to the main casing 32 of the water mixer 30 is controlled by the valve member 38 which in its downseated position controls a passage 44 for the heated fluid provided in a wall of the end casing 40 for this purpose. The valve member 38 is provided on one side with a depending stem 46 which projects through a spider 48 supported within the end casing 40 and forming a seat for a coil spring 50 serving to bias the valve member 38 into its upseated position.

A second stem 52 projects from the opposite side of the valve member 38 beyond the chamber 34 and is engaged by one end of a thermostatic element 54 positioned within the main casing 32.

The thermostatic element 54 is adapted to expand when sufficiently heated by the fluid in the main casing 32 and will serve to move the valve member 38 from the upseated toward the downseated position. The opposite end of the thermostatic element 54 is engaged by a bellows 56 forming part of a second thermostatic element and which is housed partly within an upper casing 58 secured to the main casing 32. The bellows 56 is normally biased away from the first thermostatic element 54 by a coil spring 60 operative at one end against packing 62 positioned around the first thermostatic element 54 and at the other end against the bellows 56.

The interior of the bellows 56 communicates with the usual capillary tube 64 and bulb 66 which, as shown in Fig. 1 of the drawings, is positioned exteriorly of the space which is being conditioned by the coils 24 and preferably outdoors. The outside air temperature so acts upon the bulb 66 that the temperature of the water delivered by the mixing valve 30 is modulated in direct proportion to this outside temperature. Means for adjusting this proportion at the water mixture 30 are provided and takes the form of an adjusting screw 68 mounted in an end cap 70 secured to the upper casing 58. The inner end of the adjusting screw 68 engages with the bellows 56 and is movable toward and away therefrom by manual operation, as will be apparent.

Means responsive to temperature changes within spaces responsive to the condition of the coils 24 is provided for controlling the temperature of the spaces by controlling the flow of the heated fluid to the coils 24. This means comprises a combined throttling valve and temperature sensitive element designated generally by the reference numeral 72 and shown in detail in Fig. 2.

The thermostatic valve 72 comprises a valve body 74 having an inlet 76 and outlet 78 separated by a partition 80. The partition 80 is suitably apertured to provide a passage 82 controlled by a valve member 84 having a stem 86 projecting at one end into a bonnet 88 for the valve body member 74. An expansible actuating member 90 is secured to the projecting end of the valve stem 86 and is subject to the pressure of a thermal liquid contained within the member 90 and also within a capillary tube 92 and bellows element 94 connected thereto in a closed system. The end of the capillary tube 92 adjacent the actuating member 90 communicates with a hollow bushing 95 carried by the actuating member 90 and secured to the bonnet 88. The opposite end of the capillary tube 92 communicates with the bellows 94 which may be spaced at any desired distance from the actuating member 90. The bellows element 94 is housed within a casing 96 and is engaged at one end by an override spring 98 supported in the casing 96 and at the other end by an adjusting screw 100 which projects exteriorly of the casing 96.

One of the thermostatic valves 72, as indicated in Fig. 1 of the drawings, is provided for each coil 24 and is positioned with the valve body 74 connected between the related panel coil 24 and the return pipe 28 to control the flow of fluid therein. The casing 96 containing the bellows element 94 is secured in some convenient location within the space responsive to the condition of the related coil 24. Thus, the position of the valve member 84 relative to the passage 82 will be controlled by the position of the actuating member 90 responsive to the thermal condition of the bellows 94. It should be noted that a throttling or modulating type of control is provided as will hereinafter be described. Upon a sufficient increase in the temperature to which the bellows 94 responds as regulated by the adjusting screw 100, then the valve member 84 will be moved to closed position relative to the passage 82 to shut off the flow of fluid from the inlet opening 76 to the outlet opening 78.

Circulation of the fluid from the water heater 10 through the supply and return pipes 26 and 28, respectively, is effected by the provision of a pump 102 which is connected in the return pipe 28 between the coils 24 and the water heater 10. A check valve 104 is provided in the return pipe 28 between the pump 102 and the coils 24 to insure the desired direction of flow. The flow of fluid between the mixing valve 30 and the coils 24 is under control of flow controlling means comprising a solenoid valve 106 which is interposed at a convenient location between these elements and is electrically operated upon energization of its coil 107 by means to be described hereinafter.

As previously indicated this invention contemplates the provision of means to prevent excessive temperature increase in the spaces being heated by the coils 24 due to a rapid rise in the outdoor temperature. To this end, provision is made for flushing the coils 24 with relatively cold water for limited periods when the outside temperature exceeds a certain predetermined value. Thus, an upper by-pass pipe 108 is connected at one end to the main inlet pipe 20 ahead of the water heater 10 and to the supply pipe 26 at the opposite end, the latter connection being intermediate the solenoid valve 106 and the coils 24. A lower by-pass pipe 110 has one end connected to the return pipe 28 between the check valve 104 and the thermostatic valve 72 and has its opposite end connected to the cross fitting 31.

The flow of fluid in the upper and lower by-pass pipes 108 and 110 is under control of flow controlling means comprising second and third solenoid valves 114, 116 respectively which are electrically operated upon energization of coils 115 and 117 respectively by means to be described hereinafter. A drain connection 118 and a manually operated shut-off valve 120 are provided in the lower by-pass pipe 110 between the third solenoid valve 116 and the cross connection 31.

Thermostatic switch means 122 are provided for controlling the operation of the flow controlling means comprising solenoid valves 106, 114 and 116. The thermostatic switch means 122 includes a rotatable switch arm 124 adapted to connect a pair of diametrically opposite contact means 126 and 127 or, alternatively, another pair of diametrically opposite contact means 128 and 129. Movement of the switch arm 124 into one or the other of its operative positions is caused by response of the thermostatic switch means 122 to changes in temperature exterior of the spaces being heated by the coils 24. In this instance, a thermal actuating element (not shown) for the switch arm 124 is connected by a capillary tube 130 to a bulb element 132 which is located outdoors to respond to the temperature condition at that location.

The system includes means to turn the circulating pump 102 off during the night hours and such means is shown as comprising a switch 134. It will be understood that a clock control (not shown) is included for operating the switch 134 at preset times but as such devices are well known, further description is deemed unnecessary. The switch 134 is arranged to control the pump 102 only as permitted by a low temperature cut-off thermostat 136 which, as will be hereinafter apparent, reestablishes the operation of the pump 102 if the temperature of the spaces being heated by the coils 24 falls below a certain predetermined temperature for which the thermostat 136 is set. A thermostatic cut-out 138 is located at the motor of the pump 102 as a protective device therefor to respond to excess temperature conditions occurring in the pump.

The flow of cooling fluid in the upper and lower by-pass pipes 108 and 110 is controlled by operation of a timing device which is here shown merely as a switch 140. Such timing devices employ a low-speed electric drive from a synchronous clock motor (not shown) and normally maintain a closed circuit position when deenergized. In this instance, the timing device including switch 140 is of the type which can be set to remain closed for approximately five minutes upon energization, will open and remain open for approximately twenty-five minutes when energized and then will automatically recycle. It will be apparent hereinafter that immediately upon closing of the circuit wherein it is connected, the switch 140 will introduce a five-minute period during which cold water flushing for the coils 24 can be conducted. Further operation of the switch 140, together with that of the remaining components of the system, will be apparent from the description of the operation of the temperature control system, which now proceeds, it being noted that a description of the wiring diagram is now included.

In the operation of the system, it can be assumed that the thermostatic switching device 122 is in the position shown in Fig. 1 of the drawings and that the outside temperature to which the bulb 132 is responsive is such as to cause the switch arm 124 to remain in the position shown for closing the contacts 126, 127 and establish a heating circuit. It is further assumed that the clock-operated switch 134 is also in the closed position shown in full lines in the drawing. The thermostatic cut-out 138 is assumed to be responding to a temperature condition lower than that for which it is set to open and is therefore in the closed position shown in the drawings. Thus, upon closing of a double-pole main switch 142, a circuit is established as follows: line wire 144, upper pole of main switch 142, wire 146, contact 126, switch arm 124, contact 127, wire 148, switch 134, wire 150, wire 152, coil 107, wire 154, wire 156, lower pole of main switch 142 and wire 158 to line wire 160. Such circuit will serve to energize the coil 107 and the solenoid valve 106 will thereupon open.

Simultaneously, a parallel circuit is established as follows: line wire 144, upper pole of main switch 142, wire 146, contact 126, switch arm 124, contact 127, wire 148, switch 134, wire 150, wire 162, thermostatic cut-out 138, wire 164, pump 102, wire 166, wire 156, lower pole of main switch 142 and wire 158 to line wire 160. This circuit will serve to energize the pump 102 for circulation of fluid through the coils 24.

The temperature of the fluid circulated by the pump 102 is controlled by the mixing valve 30. As previously indicated, this mixing valve 30 establishes a circulating fluid temperature in direct proportion to the outside air temperature. Thus, if the outside temperature is below that for which the adjusting screw 68 has been set, then the pressure of the thermal liquid in the bellows 56 is such as to permit the coil spring 60 to bias the bellows 56 to its contracted position. The thermostatic element 54 in the mixing valve 30 is responsive to the temperature of the fluid in the mixing valve 30 and, under these stated conditions, will also be in contracted position permitting the coil spring 50 to bias the valve member 38 toward closed position relative to the passage 36. It will be apparent that the valve member 38 may be occupying a position intermediate the passages 36 and 44 at this time or may be fully seated for closing passage 36.

In this intermediate or upseated position of the valve member 38 heated fluid from the water heater 10 will flow from the pipe 42 through the passage 44 and then through the main casing 32 for outlet through the pipe 26. As the solenoid valve 106 is in open position, such heated fluid will be conveyed to the coils 24. If the temperature condition in the space where the bellows 94 are located is lower than that for which the adjusting screws 100 of the thermostatic valves 72 have been set, then the bellows 94 thereof will be in contracted position. Consequently, the diaphragm elements 90 will also be in contracted condition so that the valve members 84 will be in open position relative to the pasage 82. The heated fluid will thus be permitted to enter the return pipe 28 and flow past the check valve 104 to be returned by the pump 102 either to the water heater 10 or the mixing valve 30 by pipe 33. Thus, in the event that the valve member 38 of the mixing valve 30 is occupying a position intermediate the passages 36 and 44 then the returned fluid will pass through the opening 36 to be blended with the heated water from the pipe 42 before flowing into the supply pipe 26 again.

As the outside temperature to which the bulb 66 responds increases, then the temperature of the water in the supply pipe 26 is correspondingly reduced. Such operation is due to the bellows 56 responding to an increase in pressure of the thermal liquid in the bulb 66 to move the thermostatic element 54 in a direction to force the valve member 38 toward a downseated position away from the passage 36. Thus, a greater proportion of returned water from the pipe 33 will be admitted to the main casing 32 to blend with the heated water from the pipe 42. This action will tend to lower the temperature of the water supplied to the coils 24 by the supply pipe 26.

The thermostatic valve 72 provide a throttling type of control to automatically compensate for changes in the individual zone temperature conditions. The devices are thus distinguished from the usual manually set and relatively inaccessible valves which require careful and tedious adjustment to obtain the desired heat balance conditions. Full use is made in this invention of the modulating or throttling action of the valves 72 in the intermediate positions of the valve members 84 and the result is an improvement over the on-off type of operation customarily obtained. In addition, these valves 72 automatically compensate for changes in the heat input requirements caused by variable factors such as solar radiation, shifting winds, open windows, supplemental heat sources such as fireplaces and any other factors which might affect the heating requirements of the zone. It is apparent that the automatic adjustment of the valves 72 between open and closed positions for either complete shut-off, throttling action or full-open flow eliminates the expense involved in balancing or adjusting each individual zone manually.

When the outside temperature to which the bulb 132 of the thermostatic switch means 122 responds exceeds a certain predetermined value for which this switch means 122 has been set, then the switch arm 124 is operated to open the contacts 126, 127 and close the contacts 128, 129. Such operation will serve to open the circuit of the coil 107 of the solenoid valve 106 and also the circuit of the pump 102 as previously traced. The pump 102 thereupon ceases to circulate heated fluid to the coils 24 and the flow of heated fluid from the mixing valve 30 to the supply pipe 26 is cut-off by closing of the solenoid valve 106.

In the new position of the switch arm 124 two circuits are established, one of which is as follows: line wire 144, upper pole of main switch 142, wire 168, contact 128, switch arm 124, contact 129, wire 170, switch means 140, wire 172, coil 115, wire 174, wire 156, lower pole of main switch 142 and wire 158 to line wire 160. This circuit will serve to energize the coil 115 and the solenoid valve 114 thereupon opens.

The other circuit established in the new position of the thermostatic switch means 122 is as follows: line wire 144, upper pole of main switch 142, wire 168, contact 128, switch arm 124, contact 129, wire 170, switch means 140, wire 176, coil 117, wire 178, wire 156, lower pole of main switch 142 and wire 158 to line wire 160. This circuit serves to energize the coil 117 and the solenoid valve 116 thereupon moves to open position.

As previously stated, the timing device 140 is in closed position when deenergized and will remain in closed position for a limited period, such as five minutes, upon energization of the circuit in which it is connected. Thus, for this limited period unheated fluid under pressure from the source of supply will be delivered to the coils 24 through the upper by-pass pipe 108, supply pipe 26, coils 24. The pressure of the fluid so delivered is sufficient to force the valve members 84 of the thermostatic valves 72 to their maximum open position regardless of the expanded position of the bellows 94 and the actuating members 90. Such operation will not damage the mechanism inasmuch as the override spring 98 serves to accommodate the added expansion of the bellows 94. After passing through the thermostatic valves 72 the cooling fluid travels through the return pipe 28 to the lower by-pass pipe 110 and is discharged through the drain connection 118.

The timing device 140 provides the described cycling action for the cooling operation by opening the circuit of the coils 115, 117 of the solenoid valves 114, 116 after the five-minute period has elapsed and maintaining these valves closed for the next twenty-five minutes. In the event that the switch arm 124 remains in the new position for closing the contacts 128 and 129, then a continued cycle of intermittent flushing for five-minute periods ensues. Upon return of the switch arm 124 to its original position for closing the contacts 126, 127, then the heating circuit will again be closed as previously described.

During the night-time the night clock switch 134 can be adjusted to open the heating circuit previously traced and deenergize the pump 102 as desired. During this period, should the temperature in the space in which the thermostat 136 is located fall below that for which this thermostat has been set, then a shunt circuit is established around the night clock switch 134 by wire 180 connected at one end to wire 148 and at the opposite end to the movable arm of the thermostat 136, and by wire 186 connected at one end to contact 184 of the thermostat 136 and at the opposite end to wire 152. Such shunt circuit will, of course, serve to cause energization of the pump 102 despite the open position of the switch 134.

It will be understood that many changes may be made in the details of construction and arrangement of parts without departing from the scope of the invention so that this description and accompanying drawings are intended by way of illustration only and are not to be construed in a limiting sense.

I claim:

1. In a temperature control system in combination, heating means, heat exchanging means, means for circulating fluid in heat exchange relation with said heating means and delivering said fluid to said heat exchanging means, first flow controlling means operable to control the flow of heated fluid to said heat exchanging means, means for by-passing fluid around said heating means and said first flow controlling means for delivery to said heat exchanging means by said fluid circulating means, means for discharging said by-pass fluid from said fluid circulating means after delivery to said heat exchanging means, second flow controlling means operable to control the flow of fluid in said by-pass means and said discharge means, thermostatic switch means for controlling both said first and second flow controlling means and having a plurality of operative positions adapted to be established alternatively in response to changes in temperature such as would cause a demand for more or less heat from said heat exchanging means, and connections between said thermosatic switch means and each of said first and second flow controlling means by which the latter are controlled selectively according to the position of said thermostatic switch means.

2. In a temperature control system, in combination, heating means, heat exchanging means, means for circulating fluid in heat exchange relation with said heating means and delivering said fluid to said heat exchanging means, first flow controlling means operable to control the flow of heated fluid to said heat exchanging means, means for by-passing fluid around said heating means and said first flow controlling means for delivery to said heat exchanging means by said fluid circulating means, means for discharging said by-pass fluid from said fluid circulating means after delivery to said heat exchanging means, second flow controlling means operable to control the flow of fluid in said by-pass means and said discharge means, thermostatic switch means for controlling both said first and second flow controlling means and having a plurality of operative positions adapted to be established alternatively in response to changes in temperature such as would cause a demand for more or less heat from said heat exchanging means, connections between said thermostatic switch means and each of said first and second flow controlling means by which the latter are controlled selectively according to the position of said thermostatic switch means, and a timing device in the connections between said thermostatic switch means and said second flow controlling means, said timing device being adapted to control said second flow controlling means in a manner to limit the period of time during which said by-pass fluid is delivered to said heat exchanging means.

3. In a temperature control system, in combination, heating means, heat exchanging means, means for circulating fluid in heat exchange relation with said heating means and delivering said fluid to said heat exchanging means, first flow controlling means operable to control the flow of heated fluid to said heat exchanging means, means for by-passing fluid around said heating means and said first flow controlling means for delivery to said heat exchanging means by said fluid circulating means, means for discharging said by-pass fluid from said fluid circulating means after delivery to said heat exchanging means, second flow controlling means operable to control the flow of fluid in said by-pass means and said discharge means, thermostatic switch means for controlling both said first and second flow controlling means and having a plurality of operative positions adapted to be established alternatively in response to changes in temperature such as would cause a demand for more or less heat from said heat exchange means, connections between said thermostatic switch means and each of said first and second flow controlling means by which the latter are controlled selectively according to the position of said thermostatic switch means, and a timing device in the connections between said thermostatic switch means and said second flow controlling means, said timing device being adapted for maintaining the last said connections open for a predetermined period and closed for another predetermined period while said thermostatic switch means remains in a position where by-pass fluid is delivered to said heat exchange means.

4. In a temperature control system, in combination, heating means for a fluid, supply and return means for delivering heated fluid to a space and returning said fluid to said heating means, means connected to said supply and return means for mixing the fluid therein, means responsive to changes in temperature exterior of said space and connected to said mixing means for controlling the proportion of mixed supply and return fluid to said space, first flow controlling means operable to control the flow of said mixed fluid to said space, means for by-passing supply fluid around said heating means, said first flow controlling means and said mixing means for delivery to said space by said supply and return means, means for discharging said by-pass fluid from said return means anterior to said heating means, second flow controlling means operable to control the flow of fluid in said by-pass means and said discharge means, thermostatic switch means for controlling both said first and second flow controlling means and having a plurality of operative positions adapted to be established alternatively in response to changes in temperature exterior of said space, and connections between said thermostatic switch means and each of said first and second flow controlling means by which the latter are controlled selectively according to the position of said thermostatic switch means.

5. In a temperature control system, in combination, heating means for a fluid, supply and return means for delivering heated fluid to a space and returning said fluid to said heating means, means connected to said supply and return means for mixing the fluid therein, means responsive to changes in temperature exterior of said space and connected to said mixing means for controlling the proportion of mixed supply and return fluid to said space, first valve means movable between open and closed positions for controlling the flow of mixed fluid to said space, electrically operable means for operating said first valve means, means for by-passing supply fluid around said heating means, said first valve means and said mixing means for delivery to said space by said supply and return means, means for discharging said by-pass fluid from said return means anterior to said heating means, second valve means movable between open and closed positions for controlling the flow of fluid in said by-pass means and said discharge means, electrically operable means for operating said second valve means, thermostatic switch means responsive to temperature changes exterior of said space for establishing heating and cooling positions, connections between said thermostatic switch means and said electrically operable means for energizing the latter and causing said first and second valve means to move to open position alternatively according to the position established by said thermostatic switch means, and a timing device in the connections between said thermostatic switch means and the electrically operable means for said second valve means, said timing device being adapted for deenergizing the last said electrically operable means for a predetermined period and causing said second valve to move to closed position while said thermostatic switch means remains in said cooling position.

6. In a temperature control system, in combination, heating means, means for circulating fluid in heat exchange relation with said heating means, space heating means connected to said fluid circulating means and to which said fluid is delivered for heating a space, first flow controlling means operable to control the flow of heated fluid to said space heating means, means for by-passing fluid around said heating means and said first flow controlling means for delivery to said space heating means by said fluid circulating means, means for discharging said by-pass fluid from said fluid circulating means after delivery to said space heating means, second flow controlling means operable to control the flow of fluid in said by-pass means and said discharge means, thermostatic switch means for controlling both said first and second flow controlling means and having a plurality of operative positions adapted to be established alternatively in response to changes in temperature exterior of said space, and means responsive to temperature changes within said space for controlling the temperature thereof by controlling the flow of heated fluid to said space heating means.

7. In a temperature control system, in combination, heating means, means for circulating fluid in heat exchange relation with said heating means, space heating means connected to said fluid circulating means and to which said fluid is delivered for heating a space, first flow controlling means operable to control the flow of heated fluid to said space heating means, means for by-passing fluid around said heating means and said first flow controlling means for delivery to said space heating means by said fluid circulating means, means for discharging said by-pass fluid from said fluid circulating means after delivery to said space heating means, second flow controlling means operable to control the flow of fluid in said by-pass means and said discharge means, thermostatic switch means for controlling both said first and second flow controlling means and having a plurality of operative positions adapted to be established alternatively in response to changes in temperature exterior of said space, and means responsive to temperature changes within said space for controlling the temperature thereof by controlling the flow of heated fluid to said space heating means, said last means including a throttling valve and a temperature sensitive element for positioning the same to limit the flow of heated fluid in said fluid circulating means.

8. In a temperature control system, in combination, heating means for a fluid, panel heating means for a space to be heated, supply and return means for circulating fluid between said heating means and said panel means, first flow controlling means operable to control the flow of heated fluid in said supply means, means for delivering unheated fluid under pressure to said supply means intermediate said first flow controlling means and said panel means, means connected to said return means for discharging said unheated fluid after delivery to said panel means, second flow controlling means operable to control the flow of unheated fluid, thermostatic switch means for controlling both said first and second flow controlling means and having a plurality of operative positions adapted to be established alternatively in response to changes in temperature exterior of said space, temperature regulating means for said panel means responsive to temperature changes within said space, said last means including a throttling valve and a temperature sensitive element exterior of said valve for positioning the same in a plurality of operative positions according to the heat requirements of said space, means interposed between said valve and said element and adapted to yield under the pressure of said unheated fluid causing a positioning of said valve irrespective of said element, and means for adjusting said element to regulate the temperature setting of said temperature regulating means.

9. In a temperature control system, in combination, heating means for a fluid, a plurality of panel heating coils for space heating, supply and return means for circulating fluid between said heating means and said coils, mixing valve means connected to said supply and return means, means responsive to changes in temperature exterior of said space and connected to said mixing valve means for controlling the proportion of mixed supply and return fluid to said space, first flow controlling means operable to control the flow of mixed fluid in said supply means, means for delivering unheated fluid under pressure to said supply means intermediate said first flow controlling means and said panel means, means connected to said return means for discharging said unheated fluid after delivery to said panel means, second flow controlling means operable to control the flow of unheated fluid, thermostatic switch means for controlling both said first and second flow controlling means and having a plurality of operative positions adapted to be established alternatively in response to changes in temperature exterior of said space, connections between said thermostatic switch means and each of said first and second flow controlling means by which the latter are controlled selectively according to the position of said thermostatic switch means, a timing device in the connections between said thermostatic switch means and said second flow controlling means and said discharge means, said timing device being adapted to control the said second controlling means in a manner to limit the period of time during which said unheated fluid is delivered to said supply means, and means responsive to temperature changes within said space for controlling the temperature thereof by controlling the flow of heated fluid in said supply means.

ROBERT C. MAIN.

REFERENCES CITED

The following references are of record in the file of this patent:

UNITED STATES PATENTS

| Number | Name | Date |
| --- | --- | --- |
| 2,065,481 | Thulman | Dec. 22, 1936 |
| 2,135,294 | Snediker | Nov. 1, 1938 |
| 2,202,731 | Crago | May 28, 1940 |
| 2,323,873 | McGrath | July 6, 1943 |
| 2,355,043 | Adlam | Aug. 8, 1944 |
| 2,404,596 | Roche | July 23, 1946 |
| 2,404,597 | McClain | July 23, 1946 |